US007382406B2

(12) United States Patent
Higuchi

(10) Patent No.: US 7,382,406 B2
(45) Date of Patent: Jun. 3, 2008

(54) NOISE REDUCTION SYSTEM, NOISE REDUCTION METHOD, RECORDING MEDIUM, AND ELECTRONIC CAMERA

(75) Inventor: Masayu Higuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 1072 days.

(21) Appl. No.: 10/287,986

(22) Filed: Nov. 4, 2002

(65) Prior Publication Data

US 2003/0122969 A1 Jul. 3, 2003

(30) Foreign Application Priority Data

Nov. 8, 2001 (JP) .............................. 2001-342729

(51) Int. Cl.
- H04N 5/217 (2006.01)
- H04N 5/208 (2006.01)
- H04N 1/46 (2006.01)
- H04N 1/38 (2006.01)
- G06K 9/40 (2006.01)

(52) U.S. Cl. ...................... 348/241; 348/252; 348/273; 358/525; 358/463; 382/262

(58) Field of Classification Search ................ 348/246, 348/247, 241, 208.6, 240.2, 252, 272, 273, 348/280, 281; 358/525, 463; 382/264, 262
See application file for complete search history.

(56) References Cited

U.S. PATENT DOCUMENTS

| 5,805,216 | A  | * | 9/1998  | Tabei et al. .................. 348/246 |
| 5,920,654 | A  | * | 7/1999  | Someya et al. ............. 382/270 |
| 6,456,325 | B1 | * | 9/2002  | Hayashi ....................... 348/234 |
| 6,496,604 | B1 | * | 12/2002 | Bricourt ...................... 382/254 |
| 6,667,766 | B2 | * | 12/2003 | Matsutani et al. .......... 348/241 |
| 6,747,697 | B1 | * | 6/2004  | Lin et al. ..................... 348/246 |
| 6,806,902 | B1 | * | 10/2004 | Donovan ..................... 348/246 |
| 6,900,836 | B2 | * | 5/2005  | Hamilton, Jr. .............. 348/241 |
| 6,977,681 | B1 | * | 12/2005 | Sasai ........................... 348/241 |
| 7,016,549 | B1 | * | 3/2006  | Utagawa ...................... 382/261 |
| 7,046,304 | B2 | * | 5/2006  | Amano ........................ 348/607 |
| 7,110,612 | B1 | * | 9/2006  | Wang .......................... 382/262 |

(Continued)

FOREIGN PATENT DOCUMENTS

JP           55-133179         10/1980

(Continued)

OTHER PUBLICATIONS

Translation of Japanese Publ. No. 55-133179.*

Primary Examiner—John M Villecco
(74) Attorney, Agent, or Firm—Volpe and Koenig, P.C.

(57) ABSTRACT

A noise reduction system comprises an inputting unit inputting image data, and a noise reduction unit performing a process for removing noise of the image data input by the inputting unit. The noise reduction unit includes a representative value calculating unit calculating a representative value from the level values of a plurality of pixels in a predetermined direction, which include an observed pixel of the input image data, a representative value selecting unit selecting one representative value according to a predetermined condition from among a plurality of representative values which are calculated by the representative value calculating unit and correspond to a plurality of directions, and a replacing unit replacing the level value of the observed pixel with the representative value selected by the representative value selecting unit.

41 Claims, 10 Drawing Sheets

U.S. PATENT DOCUMENTS

2002/0145673 A1 * 10/2002 Bompard .................... 348/246

FOREIGN PATENT DOCUMENTS

| JP | 5-136998 | 6/1993 |
| JP | 08-161483 | 6/1996 |
| JP | 2000-69291 | 3/2000 |
| JP | 2001-268485 | 9/2001 |
| JP | 2001307079 A * | 11/2001 |

* cited by examiner

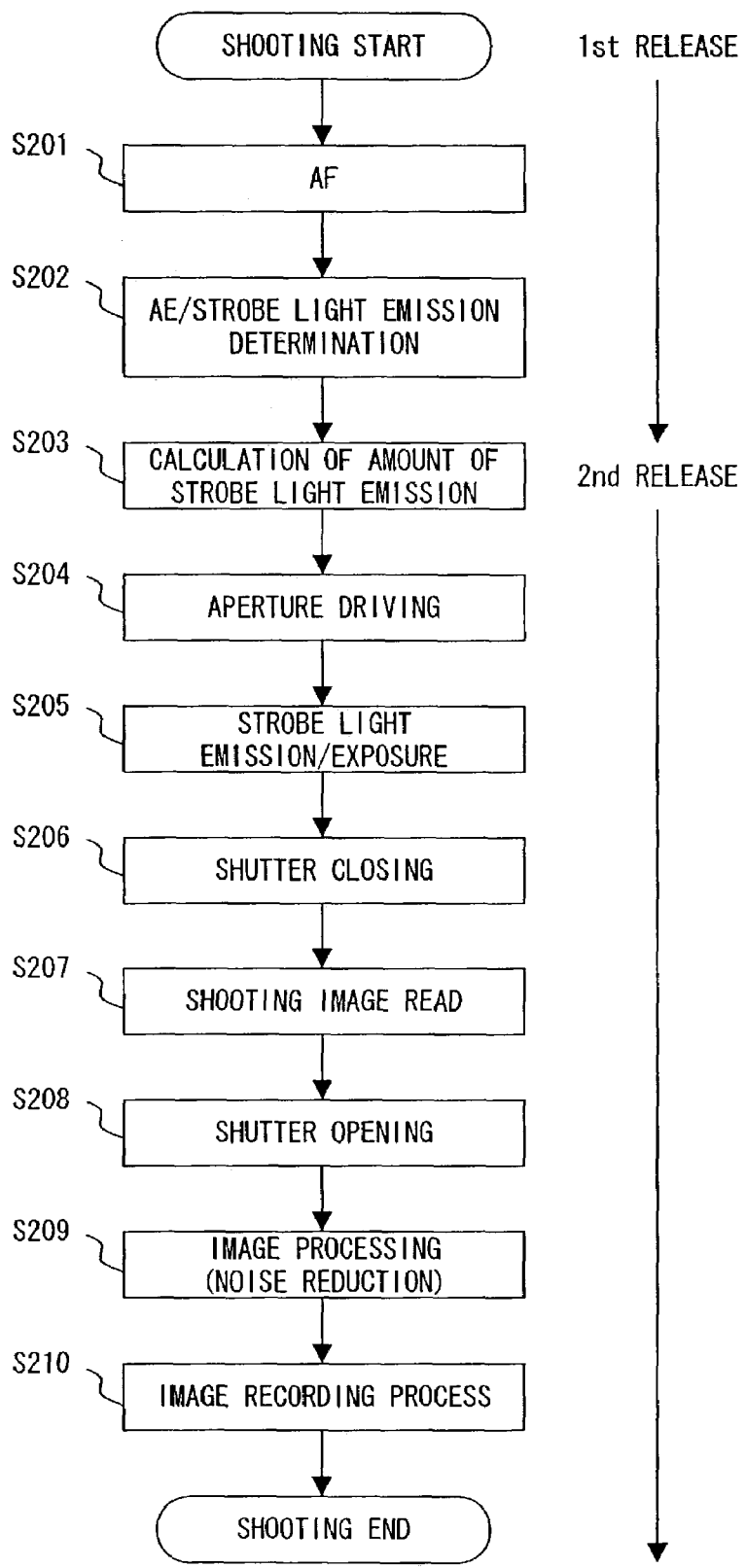
F I G. 2

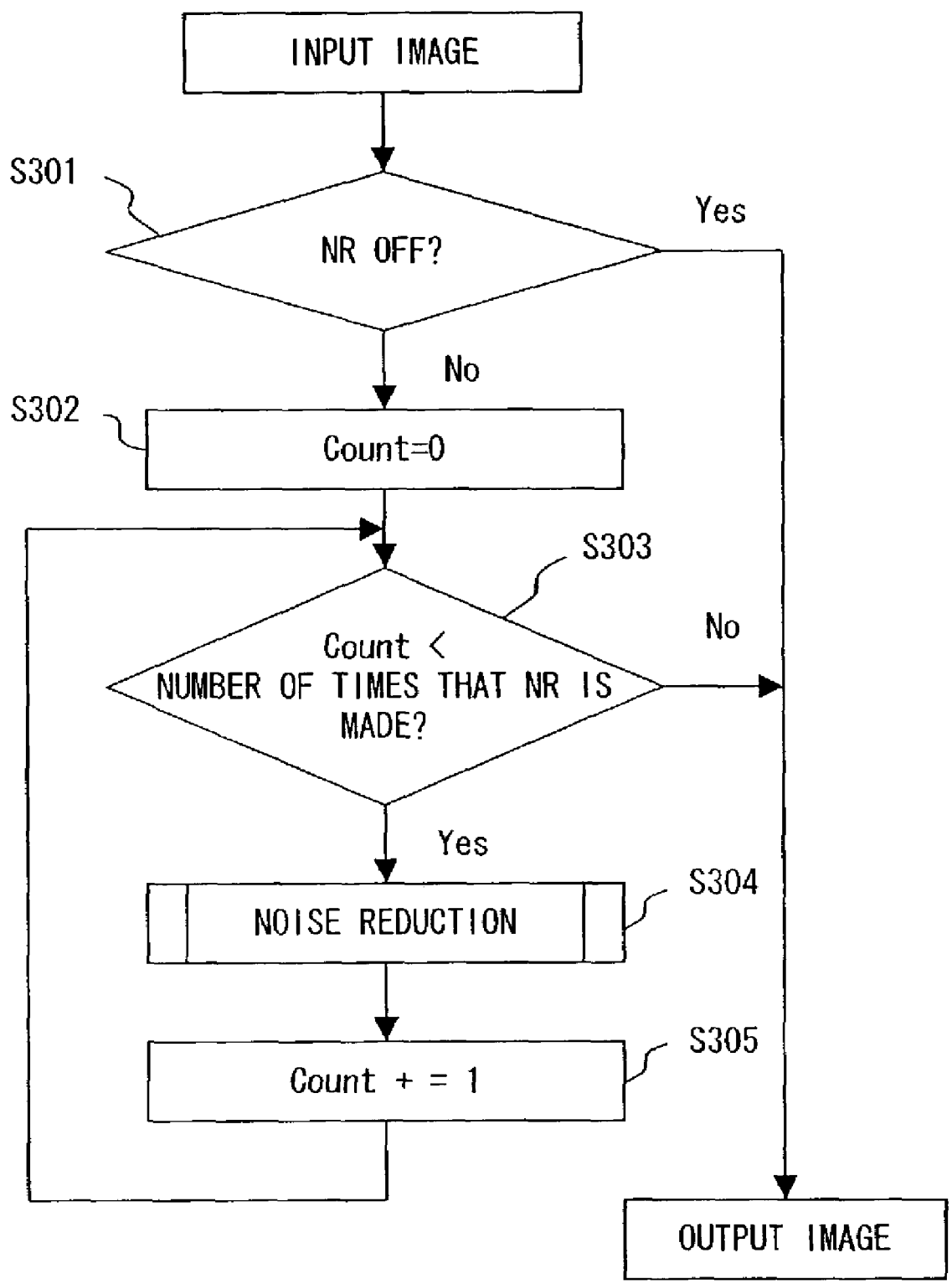
F I G. 3

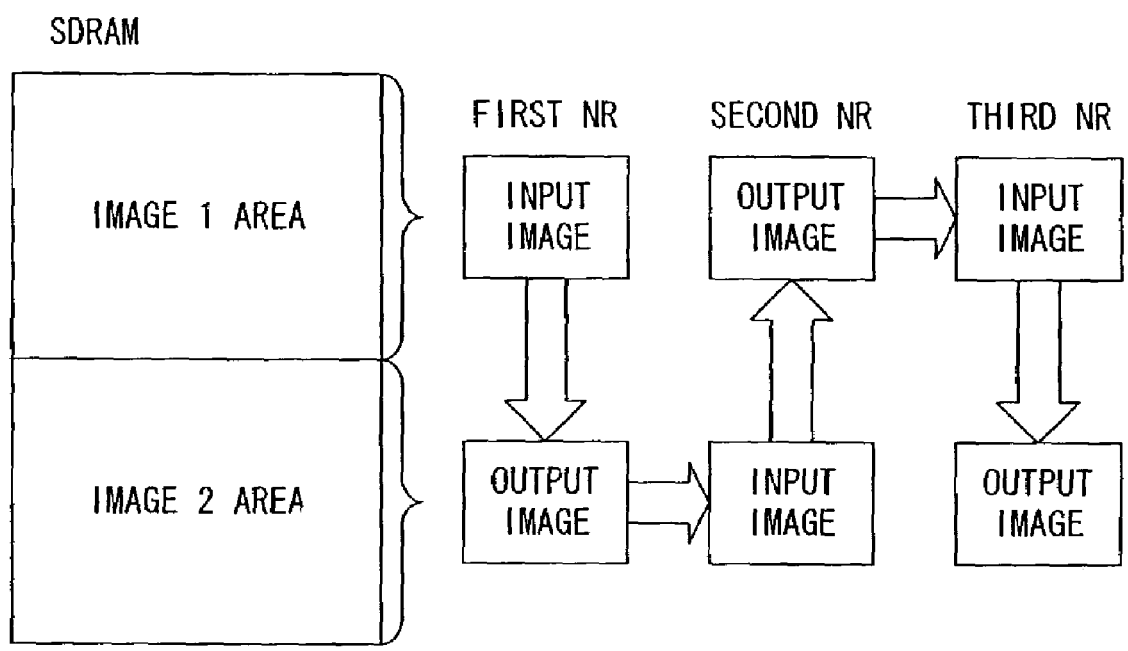
F I G. 4

FIG. 6

| GAIN SETTING | APERTURE CORRECTION SETTING | RECORDING IMAGE SIZE SETTING | NUMBER OF CALCULATION DIRECTIONS | K1 | K2 | K3 | K4 | NUMBER OF NOISE REDUCTION TIMES |
|---|---|---|---|---|---|---|---|---|
| ISO100 | +1 | 1600X1200 | 24 | 0.25 | 0.25 | 0.25 | 0.25 | 1 |
| | 0 | 1600X1200 | 24 | 0.5 | 0.25 | 0.25 | 0 | 1 |
| | -1 | 1600X1200 | 8 | 0.5 | 0.5 | 0 | 0 | 1 |
| | +1 | 640X480 | | NR OF | | | | 0 |
| | 0 | 640X480 | | NR OF | | | | 0 |
| | -1 | 640X480 | | NR OF | | | | 0 |
| ISO400 | +1 | 1600X1200 | 24 | 0.25 | 0.25 | 0.25 | 0.25 | 2 |
| | 0 | 1600X1200 | 24 | 0.25 | 0.25 | 0.25 | 0.25 | 2 |
| | -1 | 1600X1200 | 24 | 0.25 | 0.25 | 0.25 | 0.25 | 2 |
| | +1 | 640X480 | 16 | 0.5 | 0.25 | 0.25 | 0 | 1 |
| | 0 | 640X480 | 8 | 0.5 | 0.5 | 0 | 0 | 1 |
| | -1 | 640X480 | 8 | 0.5 | 0.5 | 0 | 0 | 1 |

F I G. 7

NOISE REDUCTION SYSTEM, NOISE REDUCTION METHOD, RECORDING MEDIUM, AND ELECTRONIC CAMERA

BACKGROUND OF THE INVENTION

1. Field of the Invention

The present invention relates to an image processing technique, and more particularly, to a technique for removing noise from an image that is represented by digital data.

2. Description of the Related Art

Conventionally, a smoothing filter is generally used in a process for removing noise of an image that is represented by digital data.

For example, Japanese Patent Publication No. 2000-069291 discloses a technique for preventing an image from being degraded by changing the characteristic of an applied smoothing filter according to the characteristic of input image data.

Additionally, for example, Japanese Patent No. 3165225 discloses a technique for removing extraneous noise by applying a noise removal filter (smoothing filter) only to a portion of a low luminance level, which is significantly influenced by extraneous noise applied to a luminance signal, in luminance to density conversion.

However, with the noise removal techniques using such smoothing filters, noise removal is made by performing a process such as a process for replacing the level value of an observed pixel with an average of the level values of neighboring pixels. Therefore, there is a problem that the image obtained using that process is degraded in resolution, and, namely, the image becomes a "blurred" image.

SUMMARY OF THE INVENTION

The present invention was developed to overcome the above described problem, and aims at enabling noise to be removed while preventing resolution from being degraded.

A noise reduction system, which is a first preferred embodiment of the present invention, comprises an inputting unit inputting image data, and a noise reduction unit performing a process for removing noise of the image data input by the inputting unit. The noise reduction unit is configured to comprise: a representative value calculating unit calculating a representative value from the level values of a plurality of pixels in a predetermined direction, which include an observed pixel of the input image data; a representative value selecting unit selecting one representative value according to a predetermined condition from among a plurality of representative values which are calculated by the representative value calculating unit, and corresponding to a plurality of directions; and a replacing unit replacing the level value of the observed pixel with the representative value selected by the representative value selecting unit.

With the above described configuration, the level value of an observed pixel is replaced with one representative value, which is selected according to a predetermined condition from among representative values calculated from the level values of a plurality of pixels including the observed pixel respectively for a plurality of directions, whereby noise of image data can be removed while preventing the resolution from being degraded.

BRIEF DESCRIPTION OF THE DRAWINGS

FIG. 2 is a flowchart exemplifying shooting (i.e. picture taking) processing of the electronic camera;

FIG. 3 is a detailed flowchart exemplifying the process of a noise reduction means, which is performed in process step S209 of FIG. 2;

FIG. 4 is a schematic diagram exemplifying the storage of image data being processed in an SDRAM in the process performed by the noise reduction means;

FIG. 6 is a schematic diagram exemplifying 4 pixels in a predetermined direction, which correspond to each direction identification number, and include an observed pixel;

FIG. 7 is a schematic diagram exemplifying the number of calculation directions, coefficients, and the number of noise reductions times, which are determined according to values set by a gain setting means, an aperture correction setting means, and a recording image size setting means;

DESCRIPTION OF THE PREFERRED EMBODIMENT

Hereinafter, preferred embodiments according to the present invention are explained with reference to the drawings.

Figure 1:
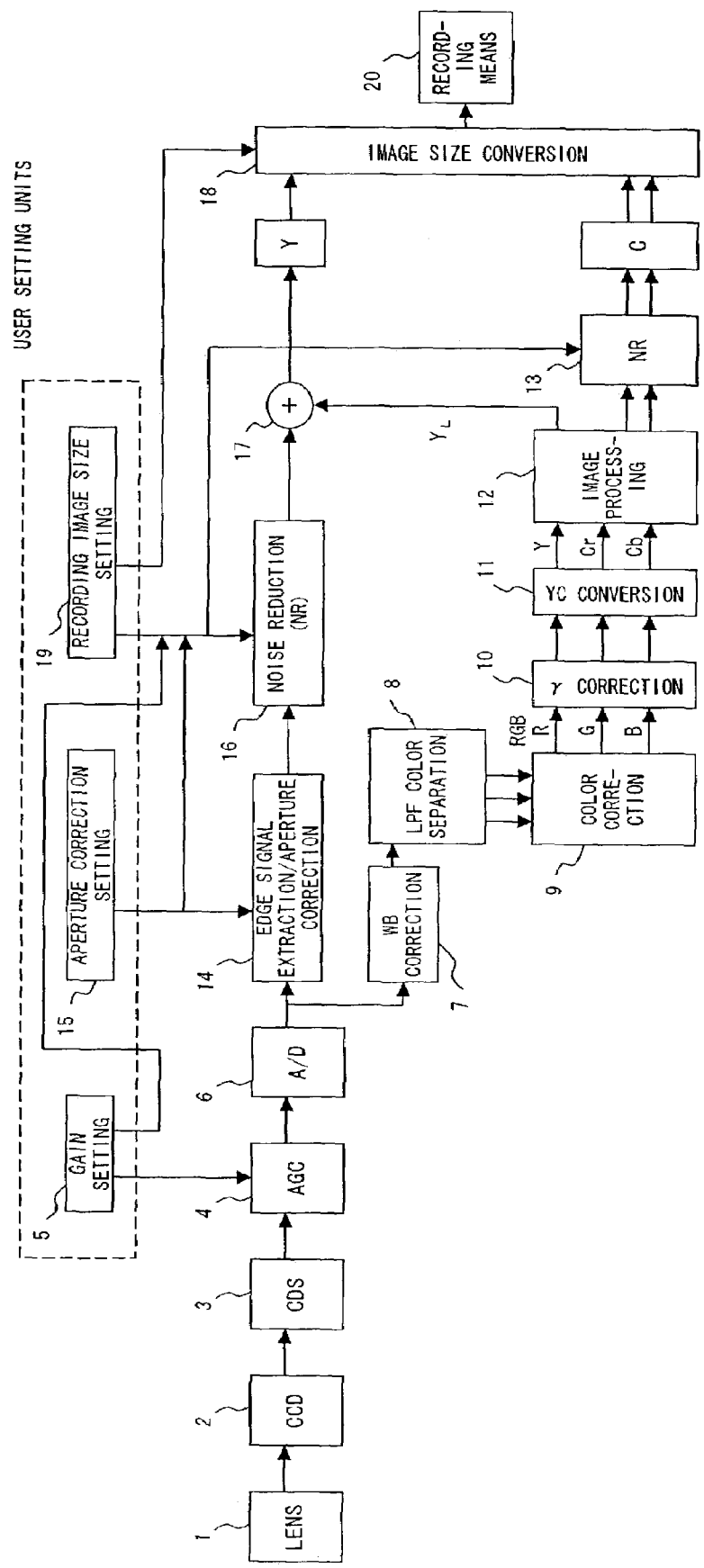
FIG. 1 is a block diagram exemplifying the configuration of an electronic camera according to a first preferred embodiment of the present invention.

FIG. 1 is a block diagram exemplifying the configuration of an electronic camera according to a first preferred embodiment of the present invention.

As shown in this figure, this electronic camera comprises: a shooting (i.e. taking) lens 1; a CCD (Charge-Coupled Device) 2 opt-electrically converting an optical subject image formed by the shooting lens 1, and generating an electric signal corresponding to the subject image; a CDS (Correlated Double Sampling) circuit 3 extracting an image signal component from the output signal of the CCD 2; an AGC (Automatic Gain Control) circuit 4 adjusting the level of the output signal of the CDS circuit 3 to a predetermined gain value; a gain setting means 5 setting a gain value according to an instruction from a user; an A/D converter 6 converting an analog image signal output from the AGC circuit 4 to a digital image signal, which is digital data; a white balance correction unit (WB) 7 making a white balance correction for a color signal of the digital image signal; a color separation circuit 8 for separating an image signal, which is obtained by removing a high-frequency component from the image signal for which the white balance correction process is performed by the white balance correction unit 7, into respective color signals of 3 primary colors, such as an R0 signal, a G0 signal, and a B0 signal; a color matrix correction circuit 9 making a color correction for improving color reproduction; a color γ correction circuit 10 performing a gamma (γ) correction process of a color signal; a YC conversion circuit 11 converting the respective R, G, and B color signals into a luminance signal YL and 2 color difference signals Cr and Cb; an image processing circuit 12 performing image processes such as achromatization, color generation, etc. for the YL, the Cr, and the Cb signals; and a noise reduction means 13 performing a noise reduction process for the color difference signals Cr and Cb, for which the image processes have been performed.

Furthermore, this electronic camera comprises: an edge signal extraction/aperture correction circuit 14 extracting only a luminance signal (Y signal) from a digital image signal, which is the output of the above described A/D converter 6, and making an edge emphasis of a predetermined aperture correction level after extracting an outline signal (hereinafter referred to as an edge signal) by removing a low-frequency component from the Y signal; an aperture correction setting means 15 for setting the aperture correction level according to an instruction from the user; a noise reduction means 16 performing a noise reduction process similar to that of the above described noise reduction means 13 for the edge signal; an adder 17 generating a luminance signal Y by adding the luminance signal YL, for which the above described image processes have been performed, to the edge signal output from the noise reduction means 16; an image size conversion means 18 converting (resizing) image data obtained from the luminance signal Y, which is the output of the adder 17, and the color difference signals Cr and Cb, which are the outputs of the above described noise reduction means 13, to a predetermined recording image size; a recording image size setting means 19 setting the recording image size according to an instruction from the user; and a recording means 20 recording an image the size of which is converted by the image size conversion means 18 onto a recording medium not shown.

Note that a block (constituent element) between the adder 17 and the image size conversion means 18 indicates that the luminance signal Y is confirmed, whereas a block between the noise reduction means 13 and the image size conversion means 18 indicates that the color difference signals Cr and Cb are confirmed.

Additionally, the above described noise reduction means 13 and noise reduction means 16 are controlled based on conditions set by the above described gain setting means 5, aperture correction setting means 15, and recording image size setting means 19.

Furthermore, this electronic camera also comprises a CPU (Central Processing Unit) which controls the operations of the whole of the electronic camera by executing a camera program prestored in an internal memory, a release button which instructs shooting preparation and shooting start, a 1st release switch which is turned on when the shooting preparation is instructed, a 2nd release switch which is turned on when the shooting start is instructed, an SDRAM (Synchronous DRAM) in which image data being processed by the noise reduction means 13 or 16, etc., are temporarily stored, and the like, although these constituent elements are not shown.

The electronic camera in this configuration example is configured as described above.

Next, control processes of the electronic camera, which are performed by the CPU of the electronic camera having the above described configuration, are explained. The CPU reads and executes the camera program stored in the internal memory, whereby the control processes of this electronic camera are implemented.

FIG. 2 is a flowchart exemplifying the shooting process of this electronic camera. The flow shown in this figure is started when the 1st release switch is turned on by pressing the release button halfway, and a shooting preparation instruction is issued.

Firstly, in S201, an AF (Auto Focus) control process for obtaining the focusing position of a focus lens, and for moving the focus lens to the focusing position is performed.

In S202, an AE (Auto Exposure) control process for metering the light amount of a subject, and for setting an aperture value and a shutter speed value according to a result of the metering is performed, and at the same time, a process for determining whether or not to perform a strobe light emission according to the result of the metering is performed.

Subsequent processes in and after S203 are started when the 2nd release switch is turned on by completely pressing down the release button, and a shooting start instruction is issued.

In S203, the amount of strobe light emission is calculated according to the result of the above described metering of the light amount of the subject. However, if it is determined that the strobe light emission is not made in the preceding step, this step is not performed.

In S204, an aperture mechanism, not shown, is driven, and the aperture is moved to the position according to the above described set aperture value.

In S205, the strobe light emission and exposure are made. Namely, the strobe light emission is performed according to the above described amount of strobe light emission, and the subject image at that time is formed on the CCD 2 by the shooting lens 1. However, if it is determined that the strobe light emission is not made in the process of S202, this strobe light emission is not made.

In S206, a shutter mechanism, not shown, is driven, and the shutter is closed.

In S207, the shot image is read. That is, an electric signal corresponding to the subject image formed on the CCD 2 is generated.

In S208, the shutter mechanism, not shown, is driven, and the shutter is opened.

In S209, the predetermined processes including the noise reduction process via the predetermined constituent elements, which are explained with reference to FIG. 1, and the like are performed on the electric signal (the output signal of the CCD 2) which is obtained by the above described process of S207 and corresponds to the subject image, so that image data in a format recorded on the recording means 20 is obtained.

In S210, the image data in the format recorded on the recording means 20, which is obtained in the above described step, is recorded on the recording means 20, and this process is terminated.

The processes up to this point are the shooting processing. The CPU performs this processing, whereby image data that represents an image obtained by shooting is recorded on the recording means 20.

Next, the process of the noise reduction means 13 or the noise reduction means 16, which is performed in the above described process of S209, is explained.

FIG. 3 is a flowchart exemplifying the process of the noise reduction means 13 or the noise reduction means 16. The flow shown in this figure is a process started when image data in a corresponding predetermined format, which is explained with reference to FIG. 1, is input to the noise reduction means 13 or the noise reduction means 16. Additionally, the process of the noise reduction means 13 and the process of the noise reduction means 16 may be performed in parallel. Alternatively, one of the processes may be started after the other is terminated.

In this figure, firstly, in S301, it is determined whether or not a noise reduction setting is OFF. If the result of this determination is "Yes", the input image data is output from the noise reduction means 13 (or 16) unchanged, and this flow is terminated. On the other hand, if the result of the determination is "No", the process proceeds to S302.

The ON/OFF setting of the noise reduction is made according to the values set by the gain setting means 5, the aperture correction setting means 15, and the recording image size setting means 19. Its details will be described later with reference to FIG. 7.

In S302, the value of the counter is set to 0 (Count=0).

In S303, it is determined whether or not the value of the counter is smaller than the number of times that the noise reduction is made. If the result of this determination is "Yes", the process proceeds to S304. If the result of the determination is "No", the image data obtained at that time is output from the noise reduction means 13 (or 16), and this flow is terminated.

Also the number of times that the noise reduction is made is set according to the values set by the gain setting means 5, the aperture correction setting means 15, and the recording image size setting means 19, and its details will be described later with reference to FIG. 7.

Figure 5:
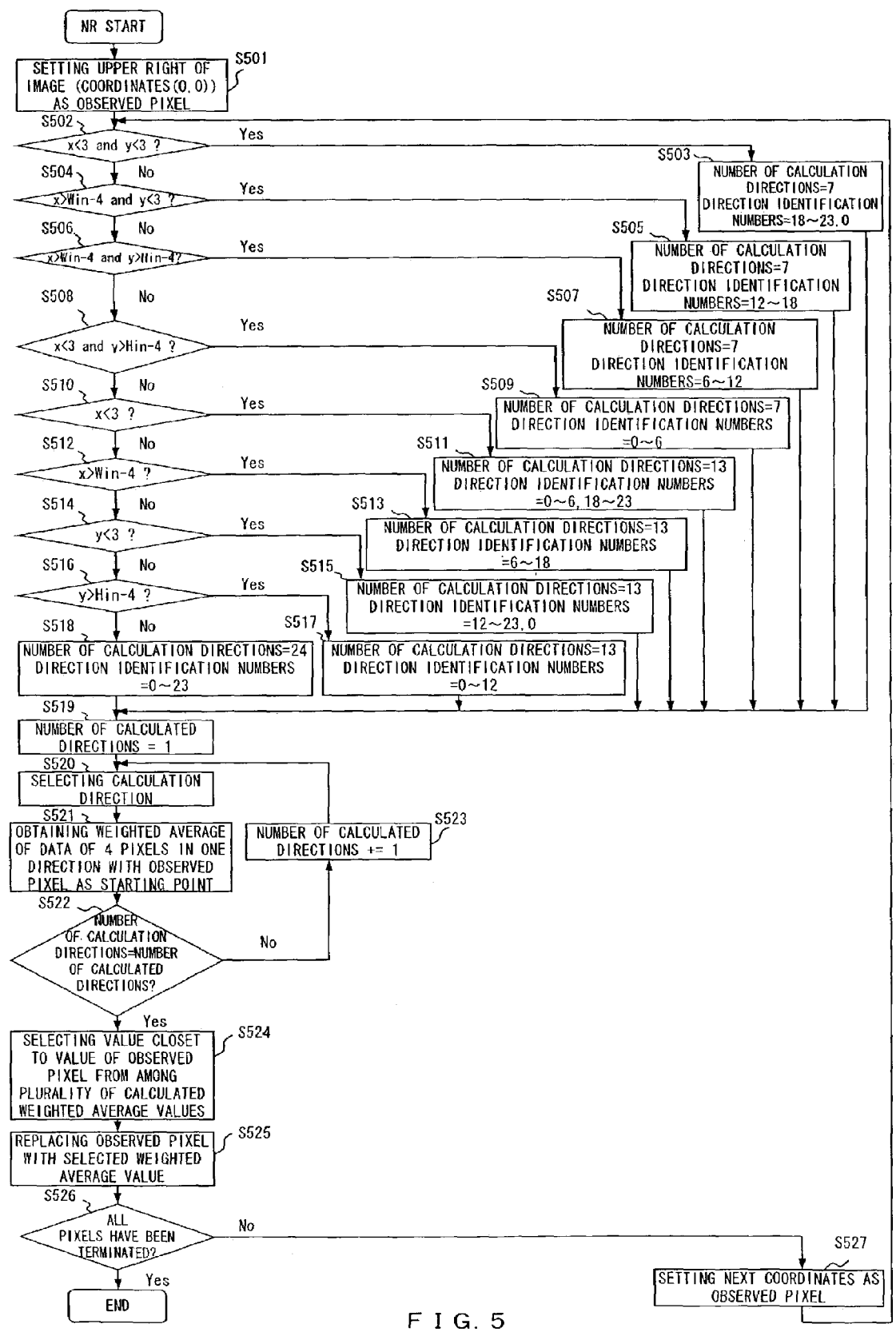
FIG. 5 is a more detailed flowchart exemplifying the noise reduction process.

In S304, a noise reduction process to be described later with reference to FIG. 5 is performed.

In S305, the value of the counter is incremented, and the process returns to S303.

The processes up to this point are the process of the noise reduction means 13 or the noise reduction means 16. The CPU performs this process, whereby the noise reduction process is performed by the set number of times that the noise reduction is made.

In the process performed by the noise reduction means 13 or 16, image data being processed is stored in the SDRAM, shown in FIG. 4, as occasion demands.

FIG. 4 is a schematic diagram exemplifying the storage of image data being processed in the SDRAM.

As shown in this figure, an image 1 area and an image 2 area are reserved as two (2) image areas in the SDRAM. The image data (input image) input to the noise reduction means 13 (or 16) is first stored in the image 1 area. Then, the image data stored in the image 1 area is read, and the image data (output image) for which the first noise reduction process (the first NR) has been performed is stored in the image 2 area. Then, the image data (input image) stored in this image 2 area is read, and the image data (output image) for which the second noise reduction process (the second NR) has been performed is again stored in the image 1 area.

Thereafter, in a similar manner, the image data (input image) stored in one of the image areas is read, and the image data (output image) for which the noise reduction process has been performed is stored in the other image area.

As described above, the image data being processed by the noise reduction means 13 (or 16) is alternately stored in the two (2) image areas reserved in the SDRAM by the set number of times that the noise reduction process is performed.

Next, the noise reduction process shown in S304 of FIG. 3 is explained.

FIG. 5 is a flowchart exemplifying the noise reduction process.

In this figure, firstly in S501, an image size represented by the number of pixels is obtained from image data to be processed, and the obtained image size is defined to be Win×Hin. Additionally, the pixel at the upper left of the image represented by the image data is defined as an observed pixel, and the coordinates of the observed pixel are set to (0,0). This image size Win×Hin, and the coordinates (x,y) of the observed pixel are stored in a predetermined area of the above described SDRAM as occasion demands, and read depending on need.

In S502, it is determined whether or not the x coordinate of the observed pixel is smaller than three (3), and its y coordinate is smaller than three (3. If the result of the determination is "Yes", the process proceeds to S503. If the result of the determination is "No", the process proceeds to S504.

In S503, the number of calculation directions is set to seven (7), and direction identification numbers at this time are set to 18 to 23, and 0. Then, the process proceeds to S519.

The number of calculation directions is a total number of representative values to be calculated, and also a value indicating a set number of direction identification numbers. Additionally, a direction identification number is a number for identifying four (4) pixels arranged in a predetermined direction, which include an observed pixel, and each direction corresponds to one direction identification number. These will be described later with reference to FIG. 6.

In S504, it is determined whether or not the x coordinate of the observed pixel is larger than Win-4, and its y coordinate is smaller than three (3). If the result of the determination is "Yes", the process proceeds to S505. If the result of the determination is "No", the process proceeds to S506.

In S505, the number of calculation directions is set to seven (7), and direction identification numbers at this time are set to 12 to 18. Then, the process proceeds to S519.

In S506, it is determined whether or not the x coordinate of the observed pixel is larger than Win-4, and its y coordinate is larger than Hin-4. If the result of the determination is "Yes", the process proceeds to S507. If the result of the determination is "No", the process proceeds to S508.

In S507, the number of calculation directions is set to seven (7), and direction identification numbers at this time are set to 6 to 12. Then, the process proceeds to S519.

In S508, it is determined whether or not the x coordinate of the observed pixel is smaller than three (3), and its y coordinate is larger than Hin-4. If the result of the determination is "Yes", the process proceeds to S509. If the result of the determination is "No", the process proceeds to S510.

In S509, the number of calculation directions is set to seven (7), and direction identification numbers at this time are set to 0 to 6. Then, the process proceeds to S519.

In S510, it is determined whether or not the x coordinate of the observed pixel is smaller than three (3). If the result of the determination is "Yes", the process proceeds to S511. If the result of the determination is "No", the process proceeds to S512.

In S511, the number of calculation directions is set to thirteen (13), and direction identification numbers at this time are set to 0 to 6, and 18 to 23. Then, the process proceeds to S519.

In S512, it is determined whether or not the x coordinate of the observed pixel is larger than Win-4. If the result of the determination is "Yes", the process proceeds to S513. If the result of the determination is "No", the process proceeds to S514.

In S513, the number of calculation directions is set to thirteen (13), and direction identification numbers at this time are set to 6 to 18. Then, the process proceeds to S519.

In S514, it is determined whether or not the y coordinate of the observed pixel is smaller than three (3). If the result of the determination is "Yes", the process proceeds to S515. If the result of the determination is "No", the process proceeds to S516.

In S515, the number of calculation directions is set to thirteen (13), and direction identification numbers at this time are set to 12 to 23, and 0. Then, the process proceeds to S519.

In S516, it is determined whether or not the y coordinate of the observed pixel is larger than Hin-4. If the result of the determination is "Yes", the process proceeds to S517. If the result of the determination is "No", the process proceeds to S518.

In S517, the number of calculation directions is set to thirteen (13), and direction identification numbers at this time are set to 0 to 12. Then, the process proceeds to S519.

In S518, the number of calculation directions is set to twenty-four (24), and direction identification numbers at this time are set to 0 to 23. In this step, if there seems no necessity to remove the noise of image data strictly according to the values set by the gain setting means 5, the aperture correction setting means 15, and the recording image size setting means 19, for example, if a set gain value is small, if a set aperture correction level is low, if a set image size is small, or the like, the number of calculation directions may be set to a small value in consideration of shortening of processing time, and direction identification numbers corresponding to that number of calculation directions may be set. For instance, the number of calculation directions is set to sixteen (16), and direction identification numbers at that time are set to 0, 1, 3, 4, 6, 7, 9, 10, 12, 13, 15, 16, 18, 19, 21 and 23. Alternatively, the number of calculation directions is set to eight (8), and direction identification numbers at that time are set to 0, 3, 6, 9, 12, 15, 18, and 21.

As described above, with the processes in S502 to S518, it is determined, based on an image size Win×Hin and the coordinates (x,y) of an observed pixel at that time, whether or not the observed pixel exists (i.e. is located) at a predetermined end or close to the end of an image represented by image data, and a predetermined number of calculation directions, and direction identification numbers at that time are set according to the result of the determination.

In S519, the number of calculated directions is set to 1.

In S520, a calculation direction is selected. That is, an unselected direction identification number is selected in ascending order of identification numbers from among the set direction identification numbers.

In S521, a weighted average value of the level values of 4 pixels, which correspond to the direction identification number being selected and includes the observed pixel, is obtained, and its value is set as a representative value corresponding to the direction identification number. How to obtain a weighted average value in this preferred embodiment will be described later with reference to FIG. 6.

In S522, it is determined whether or not the set number of calculation directions is equal to the number of calculated directions. If the result of this determination is "Yes", the process proceeds to S524. If the result of the determination is "No", the process proceeds to S523.

In S523, the number of calculated directions is incremented, and the process returns to S520.

In S524, a representative value closest to the level value of the observed pixel is selected from among a plurality of representative values (a plurality of representative values corresponding to a plurality of directions), which are obtained with the process of S521 and correspond to the set direction identification numbers. However, if a representative value having a level value that is equal to the level value of the observed pixel exists, that representative value is selected.

In S525, the representative value selected in the preceding step is replaced as the level value of the observed pixel.

In S526, it is determined whether or not the above described processes of S502 to S525 have been performed for all of pixels of the image data as an observed pixel. If the result of this determination is "Yes", this flow is terminated. If the result of the determination is "No", the process proceeds to S527.

In S527, the next coordinates are set as an observed pixel. Then, the process returns to S502.

In the step S527, the coordinates of the observed pixel are set, for example, in the following order. The coordinates are sequentially set up to (Win-1, Hin-1) in such a way that: the x coordinate is first incremented sequentially from (0,0), and the y coordinate is incremented and the x coordinate is reset to 0 after the x coordinate reaches Win-1; the x coordinate is again incremented sequentially, and the y coordinate is again incremented and the x coordinate is reset to 0 after the x coordinate reaches Win-1; and the x coordinate is again incremented sequentially.

The processes up to this point are the noise reduction process. The CPU performs this process, whereby image data whose resolution is not so degraded, and from which noise is removed can be obtained.

Next, the above described number of calculation directions and direction identification numbers are explained.

Figure 6:
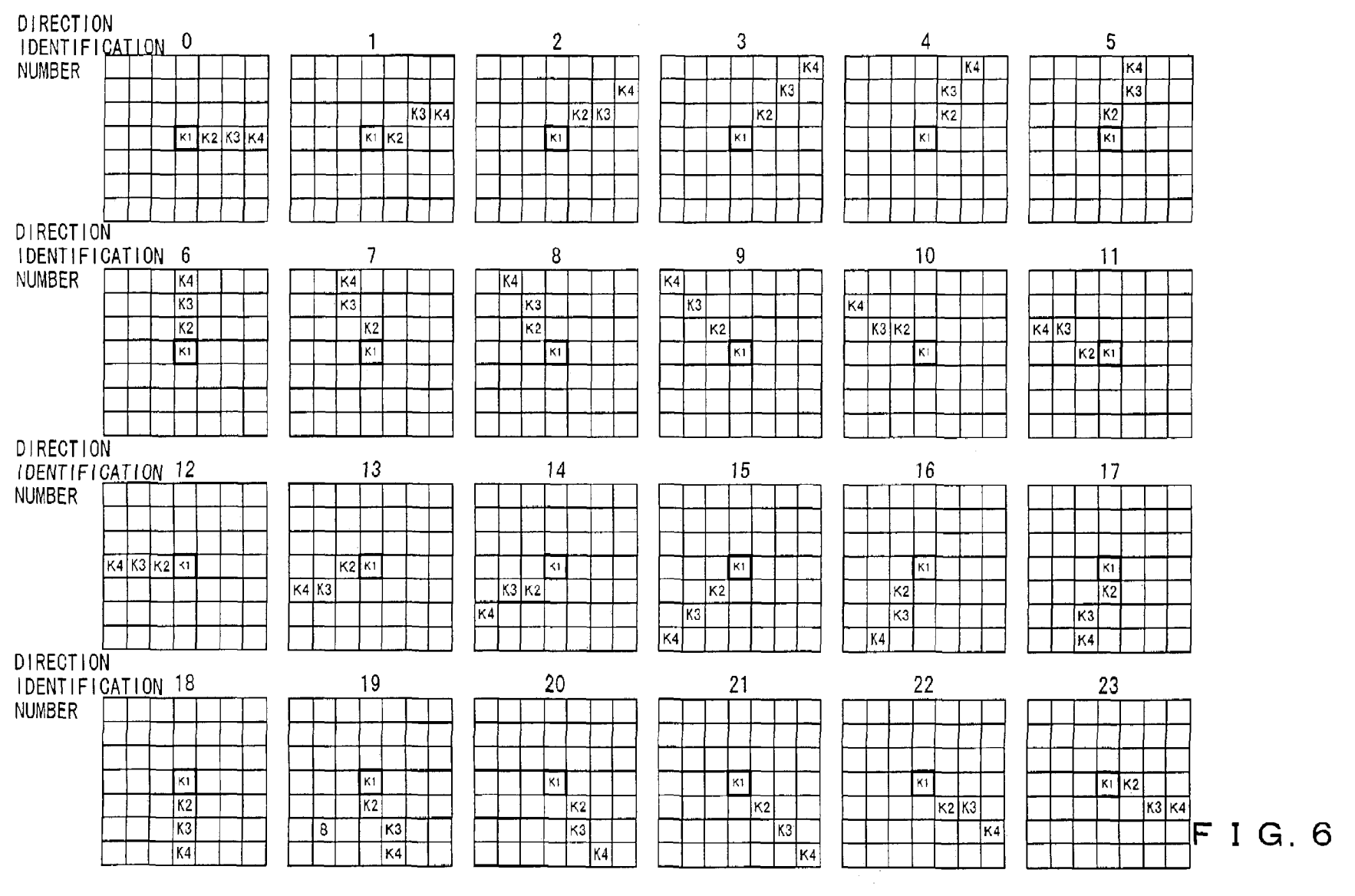

FIG. 6 is a schematic diagram exemplifying four (4) pixels in a predetermined direction, which correspond to each direction identification number, and include an observed pixel.

As shown in this figure, in this example, the number of types of four (4) pixels arranged (i.e. extending) in a predetermined direction, which include an observed pixel, is 24 in total in correspondence with direction identification numbers 0-23. Namely, an applicable number of calculation directions in this example is 24.

Furthermore, four (4) pixels including an observed pixel for each direction identification number are pixels named K1, K2, K3, and K4, and the pixel named K1 among them is the observed pixel. As shown in this figure, these 4 pixels generally extend in a radial direction from the observed pixel as a center.

Furthermore, K1, K2, K3, and K4 are coefficients corresponding to the respective pixels (however, K1+K2+K3+K4=1), and are values determined according to the values set by the gain setting means 5, the aperture correction setting means 15, and the recording image size setting means 19. Coefficients K1, K2, K3, and K4 are used when a weighted average value is calculated in the above described process of S521 in FIG. 5. In this example, if it is assumed that the level values of the respective pixels named K1, K2, K3, and K4 are G1, G2, G3, and G4, the weighted average value is calculated by G1×K1+G2×K2+G3×K3+G4×K4. Digits to the right of the decimal point of the weighted average value are rounded off.

Next, examples of the above described number of calculation directions, coefficients (K1, K2, K3, and K4), and number of noise reduction times, which are determined according to the values set by the gain setting means 5, the aperture correction setting means 15, and the recording image size setting means 19, are explained.

FIG. 7 is a schematic diagram exemplifying the number of calculation directions, the coefficients (K1, K2, K3, and K4), and the number of noise reduction times.

As shown in this figure, in this example, a gain setting of either ISO100 or ISO400 can be made by the gain setting means 5. Additionally, an aperture correction setting of any of +1, 0, and −1 can be made by the aperture correction setting means 15. Furthermore, a recording image size setting of either 1600×1200 or 640×480 can be made by the recording image size setting means 19.

When predetermined set values are set by such setting means, corresponding predetermined number of calculation directions, coefficients (K1, K2, K3, and K4), and number of noise reduction times, which are shown in FIG. 7, are set. In the example shown in this figure, as a gain value, an aperture correction level, and an image size are set to larger values, the number of calculation directions and the number of noise reduction times are set to larger values, and corresponding coefficients are set, so that a strict noise removal is made. Inversely, as the gain value, the aperture correction level, and the image size are set to smaller values, the number of calculation directions and the number of noise reduction times are set to smaller values, and corresponding coefficients are set, so that the noise removal with a low degree of strictness is made.

For example, if ISO 100 and 640×480 are respectively set as a gain value and an image size, the number of noise reduction times is set to 0, namely, a setting is made not to perform the noise reduction process. Additionally, the number of calculation directions, and coefficients are not set in this case. In other words, if the gain value and the image size are respectively set to ISO 100 and 640×480, execution of the noise reduction process is prohibited. Alternatively, if the gain value and the image size are set to other values, the execution is permitted. The execution of the noise reduction process may also be permitted/prohibited based only on a set gain value.

Additionally, in this example, if a gain value, an aperture correction level, and an image size are not set by a user, default settings are made. With the default settings, for example, the gain value, the aperture correction level, and the image size default to ISO100, 0, and 640×840 respectively. Accordingly, the noise reduction process is not performed with the settings in this case.

Next, a result of the noise reduction process represented by the above described flow diagram of FIG. 5 is explained in comparison with a result of a conventional noise reduction process.

Figures 8A, 8B, 8C, 8D:
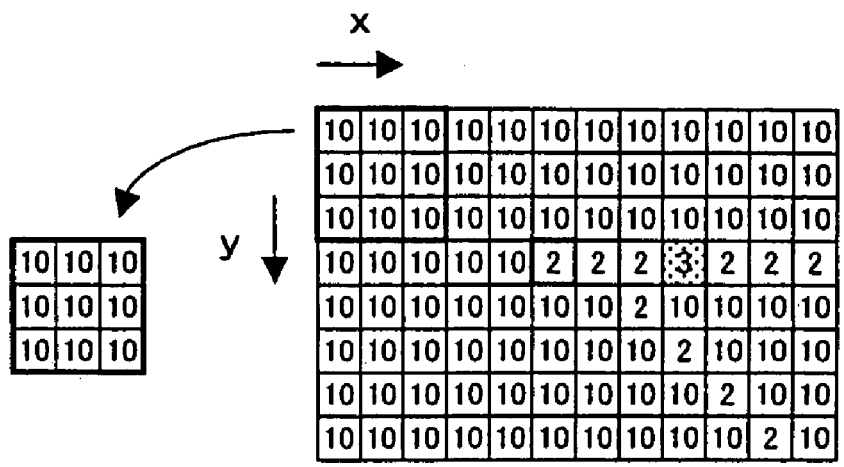
FIG. 8A is a schematic diagram exemplifying image data (input data) before the noise reduction process is performed.
FIG. 8B is a schematic diagram exemplifying an LPF (Low Pass Filter) used in a conventional noise reduction process.
FIG. 8C is a schematic diagram showing image data obtained with the conventional noise reduction process.
FIG. 8D is a schematic diagram showing image data obtained with the process shown in FIG. 5.

FIGS. 8A, 8B, 8C, and 8D are schematic diagrams explaining this comparison. FIG. 8A exemplifies image data (input data) before the noise reduction process is performed, FIG. 8B exemplifies an LPF (Low Pass Filter) used in the conventional noise reduction process, FIG. 8C shows image data obtained with the conventional noise reduction process, and FIG. 8D shows image data obtained with the noise reduction process shown in FIG. 5.

Numerals shown in FIGS. 8A, 8C, and 8D are level values of respective pixels, whereas numerals shown in FIG. 8B are coefficients corresponding to respective pixels. Additionally, in the image data shown in FIGS. 8A, 8C, and 8D, coordinates of a pixel at the upper left is assumed to be (0,0), and horizontal and vertical directions are respectively assumed to be x and y directions as indicated by arrows of FIG. 8A. Furthermore, in FIG. 8A, a line of pixels, what is referred to herein as a ruled lines is assumed to be represented by seven (7) pixels respectively having coordinates from (5,3) to (11,3), and the level value of the pixel having coordinates (8,3) is assumed to become three (3) due to noise although it was originally a level of two (2).

As shown in FIGS. 8A to 8C, in the conventional noise reduction process, a process for calculating a weighted average value of a predetermined pixel block of 3×3 in the image data shown in FIG. 8A by using the LPF shown in FIG. 8B, and for replacing this calculated value as the level value of the pixel at the upper left, which is the observed pixel of the pixel block of 3×3, is repeated. Here, the weighted average value is calculated as follows. Namely, in the predetermined pixel block of 3×3, the level values of the pixels are respectively multiplied by the coefficients that are shown in FIG. 8B and correspond to the respective pixels, and a sum of multiplication results is divided by a sum of the coefficients, so that the weighted average value is calculated. However, digits to the right of the decimal point of this division result are rounded off. For example, the weighted average value of the pixel block of 3×3, which is surrounded by the thick-lined square of FIG. 8A, results in 10 by calculating $(10\times1+10\times2+10\times1+10\times2+10\times4+10\times2+10\times1+10\times2+10\times1)/(1+2+1+2+4+2+1+2+1)$. Accordingly, the level value of the pixel at the upper left, which is the observed pixel in this case, is replaced with 10 which is surrounded by the thick-lined square in the upper left-hand corner of FIG. 8C. The process is similarly performed by shifting such a pixel block of 3×3 by one pixel, whereby the image data shown in FIG. 8C is obtained. For example, the level value of an observed pixel (the pixel which is surrounded by a thick-lined square) having coordinates (4,2) in the image data shown in FIG. 8C is replaced with seven (7) based on the pixel block of 3×3 centering around the pixel (which is surrounded by the thick-lined square and has a level value 2) having the coordinates (5,3) in the image data shown in FIG. 8A. Additionally, the level value of an observed pixel (shaded pixel) having coordinates (7,2) in the image data shown in FIG. 8C is replaced with six (6) based on the pixel block of 3×3 centering around the pixel (which is shaded and has the level value 3) having the coordinates (8,3) in the image data shown in FIG. 8A. However, since such a pixel block of 3×3 is applicable up to the third pixels from the bottom row and 2 pixels from the right-hand column of the image data shown in FIG. 8A, the size of obtained image data results in a size from which 2 pixels from the bottom row and two (2) pixels from the right-hand column of the image data before being processed are respectively omitted as shown in FIG. 8C.

For the image data (FIG. 8C) thus obtained with the conventional noise reduction process, its resolution can be identified as being significantly degraded in comparison with the image data (FIG. 8A) before being processed. For example, if a comparison is made between the pixels from the coordinates (5,3) to the coordinates (11,3) and their neighboring pixels in the image data before being processed, level differences become small between corresponding pixels in the image data after being processed, although big level differences originally exist. Besides, level values of pixels in an extensive range are replaced with values different from those before being processed. As a result, an image having low resolution, namely, a "blurred" image (image data) is obtained.

In the meantime, as shown in FIG. 8D, for the image data obtained with the noise reduction process shown in FIG. 5, its resolution is almost not degraded. By way of example, for pixels corresponding to the pixels from the coordinates (5,3) to the coordinates (11,3), and their neighboring pixels in the above described image data before being processed, level value differences similar to those before being processed are obtained, and a degradation of the resolution is not identified. Additionally, it can be also identified that the level value 3 of the pixel having the coordinates (8,3) in the image data before being processed is replaced with the level value 2, and noise is removed by the process shown in FIG. 5.

As described above, it can be identified that the resolution of image data obtained with the noise reduction process shown in FIG. 5 is almost not degraded in comparison with image data obtained with the conventional noise reduction process.

Next, a second preferred embodiment according to the present invention is explained.

Figure 9:
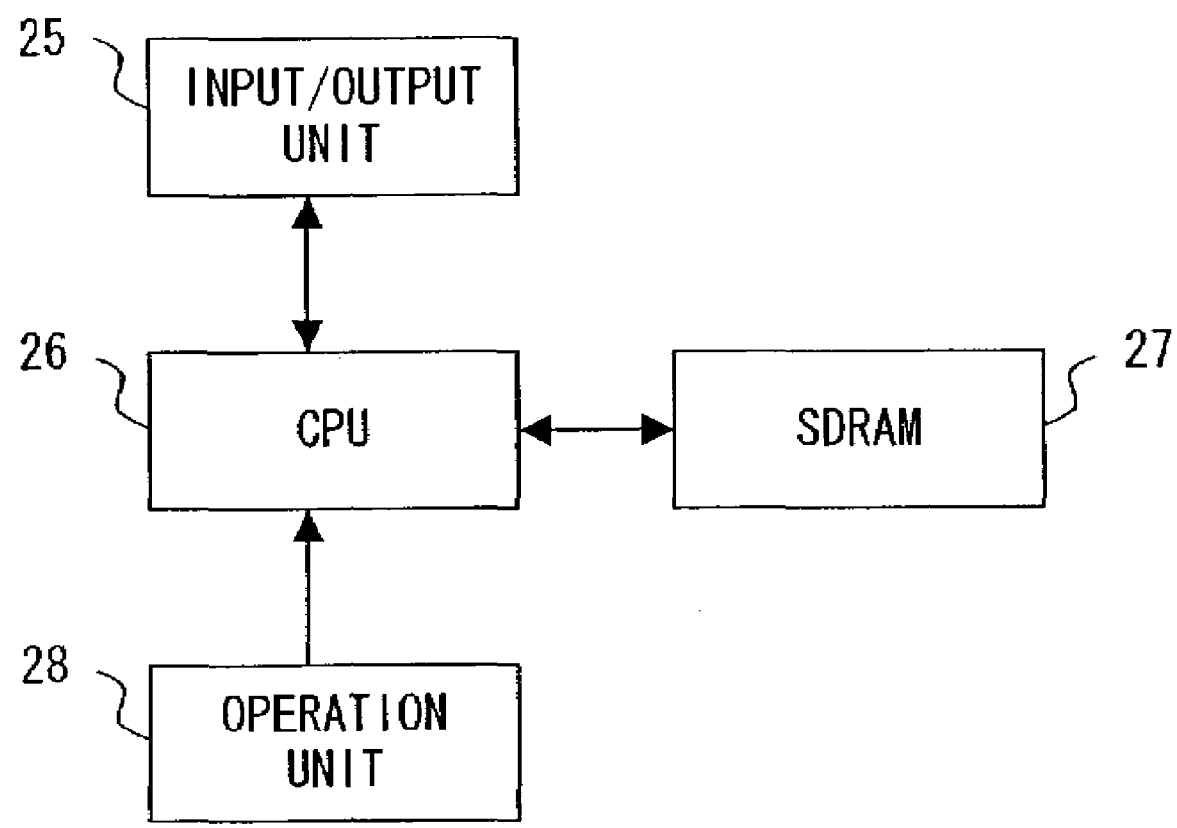
FIG. 9 is a block diagram exemplifying the configuration of a noise reduction system according to a second preferred embodiment of the present invention.

FIG. 9 is a block diagram exemplifying the configuration of a noise reduction system according to the second preferred embodiment of the present invention.

The noise reduction system shown in this figure (hereinafter referred to simply as a system) is configured by comprising an input/output unit 25, a CPU 26, an SDRAM 27, an operation unit 28, and the like.

The input/output unit 25 is intended to input image data (digital data) to this system, and to output image data from this system, and is an interface that can transfer image data, for example, between this system and a recording medium such as a memory card, etc., which is inserted into this system, or between this system and an external device connected via a cable, etc.

The CPU 26 is a central processing unit, and controls all of the operations of this system by executing a program prestored in an internal memory. For instance, the CPU 26 performs, for example, a control for noise removal (reduction) of image data input from the input/output unit 25 according to a setting instructed via the operation unit 28, and the like.

The SDRAM 27 is a memory used as a working area for performing the control process by the CPU 26. For example, image data being processed is temporarily stored.

The operation unit 28 is a generic name of various types of setting switches, buttons, etc., which are operated to instruct various types of operations and settings. Via this operation unit 28, for example, instructions to set a gain value, an aperture correction level, an image size, etc. are provided to the CPU 26.

Up to this point is the configuration of the system in this example.

The control processes of the system having the above described configuration, which are performed by the CPU 26, are implemented in such a way that the CPU 26 reads and executes the program stored in the internal memory. As the control processes, processes similar to the above described processes shown in FIGS. 3 and 5 are performed. In this case, image data is stored in the SDRAM as shown in the above described FIG. 4 during the process shown in FIG. 3. Furthermore, the numbers of calculation directions and the direction identification numbers, which are used in the process shown in FIG. 5, are based on FIG. 6, and the numbers of calculation directions, the coefficients, and the numbers of noise reduction times, which are set, are set based on FIG. 7.

As a result, image data whose degradation is not so degraded, and from which noise is removed, is obtained.

In the above described first and second preferred embodiments, a representative value of each direction identification number is calculated based on corresponding 4 pixels as shown in FIG. 6. However, the number of pixels is not limited to 4, and may be other numbers. Additionally, the total number of calculation direction is assumed to be 24. However, that number is not limited to 24, and may be other numbers. Furthermore, the pixel named K1 is assumed as an observed pixel. However, any of K2, K3, and K4 may be assumed as an observed pixel.

Still further, the first and the second preferred embodiments disclose the examples where the number of calculation directions, the coefficients (K1, K2, K3, and K4), and the number of noise reduction times are set based on the contents shown in FIG. 7. However, each of them may be set according to any one or a combination of the gain value set by the gain setting means 5, the aperture correction level set by the aperture correction setting means 15, and the recording image size set by the recording image size setting means 19.

Still further, in the first and the second preferred embodiments, a total value of values obtained by multiplying the respective level values of four (4) pixels by corresponding coefficients is assumed as a representative value. However, for example, an average value or a median value of the values obtained by multiplying the respective level values of four (4) pixels by the corresponding coefficients may be assumed as a representative value. Alternatively, an average value or a median value of the respective level values of four (4) pixels may be assumed as a representative value. The median value is a value obtained, for example, by extracting the minimum value and the maximum value from among obtained four (4) values, and by calculating (the minimum value+the maximum value)/2. Alternatively, the median value may be a value closest to the value, which is obtained by calculating (the minimum value+the maximum value)/2, among obtained four (4) values, or the second or the third value when obtained four (4) values are arranged in ascending or descending order.

Still further, in the first and the second preferred embodiments, a representative value closest to the level value of an observed pixel is selected from among a plurality of representative values as indicated by the process step S524 in FIG. 5. However, one representative value may be selected based on a different condition.

Still further, in the first and the second preferred embodiments, a total value of values obtained by multiplying the respective level values of corresponding four (4) pixels by corresponding coefficients is obtained as a representative value for each set direction identification number, and a value closest to the level value of an observed pixel among representative values of respective direction identification numbers is replaced as the level value of the observed pixel. However, for example, a standard deviation is obtained from the level values of corresponding four (4) pixels for each set direction identification number, and the level value of a pixel adjacent to the observed pixel of a direction identification number, whose standard deviation is the smallest, may be replaced as the level value of the observed pixel.

Figure 10:
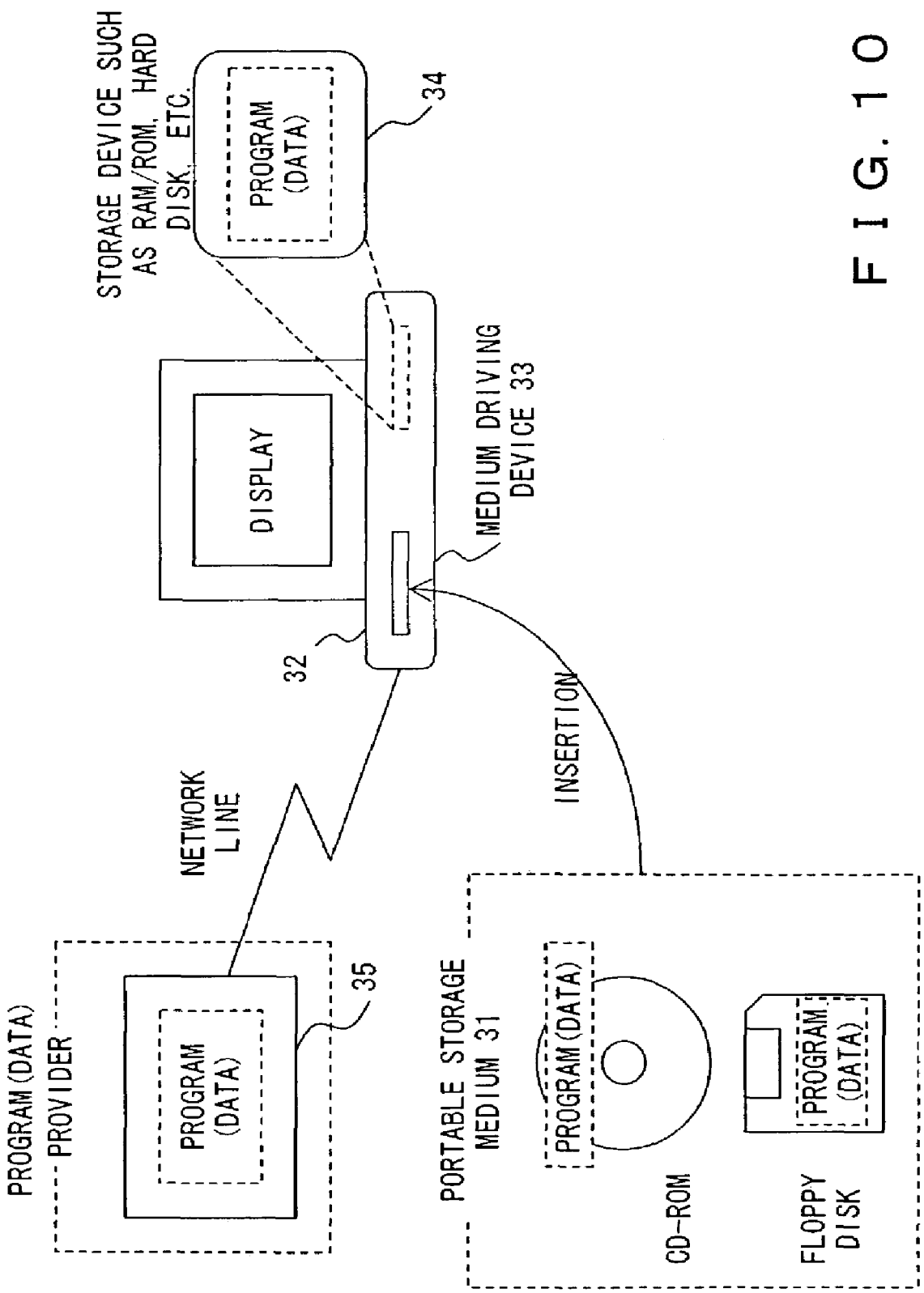
FIG. 10 is a schematic diagram exemplifying storage media on which a program is recorded.

Still further, in the first and the second preferred embodiments, for example, a computer shown in FIG. 10 may be made to execute the control processes, which are performed by the CPU comprised by the electronic camera shown in FIG. 1 or the CPU 26 of the noise reduction system shown in FIG. 9. In this case, the program stored in the internal memory of the CPU of the electronic camera or the CPU 26 may be stored onto a portable storage medium 31 such as a CD-ROM, a floppy disk (or an MO, a DVD, a CD-R, a CD-RW, a removable hard disk, etc.), or the like as shown in this figure. The portable storage medium 31 may be read by a medium driving device 33 of the computer 32, the read program may be stored in an internal memory (RAM or a hard disk, etc.) 34 of the computer 32, and the program may be executed by the computer 32. Alternatively, the program may be stored in a storage means (database, etc.) 35 within an external device (server, etc.) of an information provider, and transferred to the computer 32 via a communication link, and stored in the internal memory 34, and the computer 32 may execute the program. Note that the program stored in the memory, the storage medium, or the storage means may be a program that executes only part of the control processes performed by the CPU of the above described camera or the CPU 26.

As described above, the noise reduction system, the noise reduction method, the recording, medium recording the noise reduction program, and the electronic camera according to the present invention are explained in detail. However, the present invention is not limited to the above described preferred embodiments, and various types of improvements and modifications may be made in a scope which does not deviate from the gist of the present invention, as a matter of course.

As explained above in detail, according to the present invention, noise can be removed while preventing resolution from being degraded, and what is called a "blurred" image can be prevented from being obtained after the noise removal process is performed.

What is claimed is:

1. A noise reduction system, comprising:
a unit for inputting image data; and
a noise reduction unit performing a process for removing noise from the image data input by said inputting unit, wherein
said noise reduction unit comprises:
    a representative value calculating unit calculating a representative value using level values of all of a plurality of pixels included in a portion of the input image data, the plurality of pixels including an observed pixel and being arranged in a predetermined direction,
    a representative value selecting unit selecting one representative value according to a predetermined condition from among a plurality of representative values which are calculated by said representative value calculating unit, and correspond to a plurality of directions, and
    a replacing unit replacing a level value of the observed pixel with the representative value selected by said representative value selecting unit.

2. The system according to claim 1, wherein
said representative value calculating unit calculates one of an average value and a median value of the level values of the plurality of pixels as a representative value.

3. The system according to claim 1, wherein
said representative value calculating unit calculates one of an average value and a median value of values, which are obtained by multiplying the respective level values of the plurality of pixels by coefficients corresponding to the pixels, as a representative value.

4. The system according to claim 1, wherein
the predetermined direction is a radial direction from the observed pixel serving as a center.

5. The system according to claim 1, wherein
said representative value selecting unit selects a representative value closest to the level of the observed pixel from among the plurality of representative values corresponding to the plurality of directions.

6. The system according to claim 1, wherein
the process performed by said noise reduction unit is applied to said image data a plurality of times.

7. The system according to claim 1, further comprising:
an image size storing unit storing an image size of the image data;
an observed pixel coordinates storing unit storing coordinates of the observed pixel;
an end determining unit determining whether or not the observed pixel exists at an end or close to the end of an image based on the image data based on the image size of the image data, which is stored in said image size storing unit, and the coordinates of the observed pixel, which are stored in said observed pixel coordinates storing unit; and
a changing unit changing the predetermined direction if the observed pixel is determined to exist at the end or close to the end by said end determining unit.

8. A noise reduction method for removing noise from input image data, comprising:
calculating a representative value using level values of all of a plurality of pixels included in a portion of the input image data, the plurality of pixels including an observed pixel and being arranged in a predetermined direction;
selecting one representative value according to a predetermined condition from among a plurality of calculated representative values corresponding to a plurality of directions; and
replacing a level value of the observed pixel with the selected representative value.

9. A computer readable recording medium on which is recorded a program for causing a computer to execute a control for removing noise from input image data, the control comprising:
calculating a representative value using level values of all of a plurality of pixels included in a portion of the input image data, the plurality of pixels including an observed pixel and being arranged in a predetermined direction;
selecting one representative value according to a predetermined condition from among a plurality of calculated representative values corresponding to a plurality of directions; and
replacing a level value of the observed pixel with the selected representative value.

10. An electronic camera, comprising:
an image capturing element;
an A/D converting unit performing A/D conversion of an analog image signal output from said image capturing element;
a color separating unit generating a plurality of pieces of image data for respective predetermined color components from image data based on an output of said A/D converting unit; and
a noise reduction unit performing a process for removing noise from image data of a predetermined color component among the plurality of pieces of image data for the respective color components, which are generated by said color separating unit, wherein said noise reduction unit comprises
- a representative value calculating unit calculating a representative value from level values of a plurality of pixels arranged in a predetermined direction, which include an observed pixel of the image data of the predetermined color component,
- a representative value selecting unit selecting one representative value according to a predetermined condition from among a plurality of representative values which are calculated by said representative value calculating unit, and correspond to a plurality of directions, and
- a replacing unit replacing a level value of the observed pixel with the representative value selected by said representative value selecting unit.

11. The electronic camera according to claim 10, wherein said representative value calculating unit calculates one of an average value and a median value of the level values of the plurality of pixels as a representative value.

12. The electronic camera according to claim 10, wherein said representative value calculating unit calculates an average value or a median value of said level values, which are obtained by multiplying the respective level values of the plurality of pixels by coefficients corresponding to the pixels, as a representative value.

13. The electronic camera according to claim 10, wherein the predetermined direction is a radial direction extending from the observed pixel as a center.

14. The electronic camera according to claim 10, wherein said representative value selecting unit selects a representative value closest to the level value of the observed pixel from among the plurality of representative values corresponding to the plurality of directions.

15. The electronic camera according to claim 10, wherein the process performed by said noise reduction unit is applied to said image data a plurality of times.

16. The electronic camera according to claim 12, further comprising:
- a gain controlling unit amplifying an output of said image capturing element according to a setting for a gain;
- an aperture correcting unit extracting an edge component from image data based on an output of said gain controlling unit, and emphasizing the edge component according to a setting for an aperture correction; and
- a resizing unit resizing an image size of image data according to a setting for resizing, wherein
- at least one of the plurality of directions and the coefficients is changed according to at least one of the setting for a gain, the setting for an aperture correction, and the setting for resizing.

17. The electronic camera according to claim 15, further comprising:
- a gain controlling unit amplifying an output of said image capturing element according to a setting for a gain;
- an aperture correcting unit extracting an edge component from image data based on an output of said gain controlling unit, and emphasizing the edge component according to a setting for an aperture correction; and
- a resizing unit resizing an image size of image data according to the setting for resizing, wherein
- a number of times that the process performed by said noise reduction unit is applied is changed according to at least one of the setting for a gain, the setting for an aperture correction, and the setting for resizing.

18. The electronic camera according to claim 16, wherein execution of the process performed by said noise reduction unit is permitted or prohibited according to the setting for a gain.

19. The electronic camera according to claim 17, wherein execution of the process performed by said noise reduction unit is permitted or prohibited according to the setting for a gain.

20. The electronic camera according to claim 10, further comprising:
- an image size storing unit storing an image size of the image data;
- an observed pixel coordinates storing unit storing coordinates of the observed pixel;
- an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and
- a changing unit changing the plurality of directions if the observed pixel is determined to be at the end or close to the end of said image by said end determining unit.

21. The electronic camera according to claim 16, further comprising:
- an image size storing unit storing an image size of the image data;
- an observed pixel coordinates storing unit storing coordinates of the observed pixel;
- an end determining unit determining whether or not the observed pixel is located at an end or close to the end of the image based on the image data on the basis of the image size of the image data, which is stored in said image size storing unit, and the coordinates of the observed pixel, which are stored in said observed pixel coordinates storing unit; and
- a changing unit changing the plurality of directions if the observed pixel is determined to be at the end or close to the end of said image by said end determining unit.

22. The electronic camera according to claim 17, further comprising:
- an image size storing unit storing an image size of the image data;
- an observed pixel coordinates storing unit storing coordinates of the observed pixel;
- an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and
- a changing unit changing the plurality of directions if the observed pixel is determined to be at the end or close to the end of said image by said end determining unit.

23. The electronic camera according to claim 18, further comprising:
- an image size storing unit storing an image size of the image data;
- an observed pixel coordinates storing unit storing coordinates of the observed pixel;
- an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and a changing unit changing the plurality of directions if the observed pixel is determined to be at the end or close to the end of the image by said end determining unit.

24. The electronic camera according to claim 19, further comprising:

an image size storing unit storing an image size of the image data;

an observed pixel coordinates storing unit storing coordinates of the observed pixel;

an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and a changing unit changing the plurality of directions if the observed pixel is determined to be at the end or close to the end of the image by said end determining unit.

25. An electronic camera, comprising:

an image capturing element;

an A/D converting unit performing A/D conversion for an analog image signal output from said image capturing element;

an edge separating unit extracting an edge component from image data based on an output of said A/D converting unit, and generating image data; and a noise reduction unit performing a process for removing noise from the image data generated by said edge separating unit, wherein said noise reduction unit comprises a representative value calculating unit calculating a representative value from level values of a plurality of pixels arranged in a predetermined direction, which include an observed pixel of the image data generated by said edge separating unit, a representative value selecting unit selecting one representative value according to a predetermined condition from among a plurality of representative values which are calculated by said representative value calculating unit and correspond to a plurality of directions, and a replacing unit replacing a level value of the observed pixel with the representative value selected by said representative value selecting unit.

26. The electronic camera according to claim 25, wherein said representative value calculating unit calculates one of an average value and a median value of the level values of the plurality of pixels as a representative value.

27. The electronic camera according to claim 25, wherein said representative value calculating unit calculates one of an average value and a median value of values, which are obtained by multiplying the respective level values of the plurality of pixels by coefficients corresponding to the pixels, as a representative value.

28. The electronic camera according to claim 25, wherein the predetermined direction is a radial direction from the observed pixel serving as a center.

29. The electronic camera according to claim 25, wherein said representative value selecting unit selects a representative value closest to the level value of the observed pixel from among the plurality of representative values corresponding to the plurality of directions.

30. The electronic camera according to claim 25, wherein the process performed by said noise reduction unit is applied to said image data a plurality of times.

31. The electronic camera according to claim 27, further comprising:

a gain controlling unit amplifying an output of said image capturing element according to a setting for a gain;

an aperture correcting unit extracting an edge component from image data based on an output of said gain controlling unit, and emphasizing the edge component according to a setting for an aperture correction; and a resizing unit resizing an image size of image data according to a setting for resizing, wherein at least one of the plurality of directions and the coefficients is changed according to at least one of the setting for a gain, the setting for an aperture correction, and the setting for resizing.

32. The electronic camera according to claim 30, further comprising:

a gain controlling unit amplifying an output of said image capturing element according to a setting for a gain;

an aperture correcting unit extracting an edge component from image data based on an output of said gain controlling unit, and emphasizing the edge component according to a setting for an aperture correction; and a resizing unit resizing an image size of image data according to a setting for resizing, wherein a number of times that the process is performed by said noise reduction unit is applied is changed according to at least one of the setting for a gain, the setting for an aperture correction, and the setting for resizing.

33. The electronic camera according to claim 31, wherein execution of the process performed by said noise reduction unit is permitted or prohibited according to the setting for a gain.

34. The electronic camera according to claim 32, wherein execution of the process performed by said noise reduction unit is permitted or prohibited according to the setting for a gain.

35. The electronic camera according to claim 25, further comprising:

an image size storing unit storing an image size of the image data;

an observed pixel coordinates storing unit storing coordinates of the observed pixel;

an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and a changing unit changing the plurality of directions if the observed pixel is determined to be at the end or close to the end of said image by said end determining unit.

36. The electronic camera according to claim 31, further comprising:

an image size storing unit storing an image size of the image data;

an observed pixel coordinates storing unit storing coordinates of the observed pixel;

an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and a changing unit changing the plurality of directions if the observed pixel is determined to be at the end or close to the end of said image by said end determining unit.

37. The electronic camera according to claim 32, further comprising:

an image size storing unit storing an image size of the image data;

an observed pixel coordinates storing unit storing coordinates of the observed pixel;

an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and a changing unit changing the plurality of directions if the observed pixel is determined to be at the end or close to the end of said image by said end determining unit.

38. The electronic camera according to claim 33, further comprising:

an image size storing unit storing an image size of the image data;

an observed pixel coordinates storing unit storing coordinates of the observed pixel;

an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and a changing unit changing the plurality of directions if the observed pixel is determined to be at the end or close to the end of said image by said end determining unit.

39. The electronic camera according to claim 34, further comprising:

an image size storing unit storing an image size of the image data;

an observed pixel coordinates storing unit storing coordinates of the observed pixel;

an end determining unit determining whether or not the observed pixel is located at an end or close to the end of an image based on the image data on the basis of the image size of the image data, which is stored in said image size storing unit, and the coordinates of the observed pixel, which are stored in said observed pixel coordinates storing unit; and a changing unit changing the plurality of directions if the observed pixel is determined to be at the end or close to the end of said image by said end determining unit.

40. A noise reduction method of an electronic camera, comprising:

(a) performing A/D conversion for an analog image signal output from an image capturing element;

(b) generating a plurality of pieces of image data for respective predetermined color components based on image data for which the A/D conversion is performed; and (c) removing noise from image data of a predetermined color component among the plurality of pieces of generated image data for the respective color components, wherein in the step (c), a representative value is calculated from level values of a plurality of pixels arranged in a predetermined direction, which include an observed pixel of the image data of the predetermined color component, one representative value is selected according to a predetermined condition from among a plurality of calculated representative values corresponding to a plurality of directions, and a level value of the observed pixel is replaced with the selected representative value.

41. A noise reduction method of an electronic camera, comprising:

(a) performing A/D conversion for an analog image signal output from an image capturing element;

(b) extracting an edge component based on image data for which the A/D conversion is performed, and generating image data; and (c) removing noise from the generated image data, wherein in the step (c), a representative value is calculated from level values of a plurality of pixels arranged in a predetermined direction, which include an observed pixel of the generated image data, one representative value is selected according to a predetermined condition from among a plurality of calculated representative values corresponding to a plurality of directions, and a level value of the observed pixel is replaced with the selected representative value.

* * * * *